United States Patent
Jackson et al.

(10) Patent No.: US 10,346,980 B2
(45) Date of Patent: Jul. 9, 2019

(54) SYSTEM AND METHOD OF PROCESSING MEDICAL IMAGES

(71) Applicant: Proscia Inc., Haverford, PA (US)

(72) Inventors: Brian H. Jackson, Poquoson, VA (US); Coleman C. Stavish, Havertown, PA (US); Yating Jing, Baltimore, MD (US); John Kulp, Baltimore, MD (US)

(73) Assignee: PROSCIA INC., Haverford, PA (US)

( * ) Notice: Subject to any disclaimer, the term of this patent is extended or adjusted under 35 U.S.C. 154(b) by 73 days.

(21) Appl. No.: 15/797,615

(22) Filed: Oct. 30, 2017

(65) Prior Publication Data

US 2019/0130570 A1    May 2, 2019

(51) Int. Cl.
| | |
|---|---|
| G06T 7/00 | (2017.01) |
| G06T 7/11 | (2017.01) |
| G06T 11/60 | (2006.01) |
| G06F 16/51 | (2019.01) |
| G06F 16/22 | (2019.01) |
| G06F 16/583 | (2019.01) |
| G06F 16/56 | (2019.01) |

(52) U.S. Cl.
CPC ........ G06T 7/0014 (2013.01); G06F 16/2246 (2019.01); G06F 16/51 (2019.01); G06F 16/5838 (2019.01); G06T 7/11 (2017.01); G06T 11/60 (2013.01); G06F 16/56 (2019.01); G06T 2207/10056 (2013.01); G06T 2207/20004 (2013.01); G06T 2207/20021 (2013.01); G06T 2207/20221 (2013.01); G06T 2207/30024 (2013.01); G06T 2207/30096 (2013.01)

(58) Field of Classification Search
None
See application file for complete search history.

(56) References Cited

U.S. PATENT DOCUMENTS

| | | | | |
|---|---|---|---|---|
| 6,091,842 | A * | 7/2000 | Domanik | G01N 15/1468 250/201.3 |
| 8,396,269 | B2 * | 3/2013 | Henderson | G06K 9/00134 382/128 |
| 2005/0123181 | A1 * | 6/2005 | Freund | G02B 21/365 382/128 |
| 2006/0257053 | A1 * | 11/2006 | Boudreau | G06K 9/00 382/305 |

(Continued)

*Primary Examiner* — Gandhi Thirugnanam
(74) *Attorney, Agent, or Firm* — MH2 Technology Law Group LLP (57) ABSTRACT

Presented are techniques for processing medical images. The techniques can include accessing a stored medical image and electronically representing a plurality of overlapping tiles that cover the medical image, each overlapping tile including a non-overlapping inner portion and an overlapping marginal portion. The techniques can also include in parallel, and individually for each of a plurality of the overlapping tiles: applying a segmentation process to identify objects in the at least one medical image, identifying inner object data representing at least one inner object that is contained within an inner portion of at least one tile, and identifying marginal object data representing at least one marginal object that overlaps a marginal portion of at least one tile. The techniques can also include merging at least some of the marginal object data to produce merged data, and outputting object data including the inner object data and the merged data.

20 Claims, 6 Drawing Sheets

(56) References Cited

U.S. PATENT DOCUMENTS

| | | | |
|---|---|---|---|
| 2008/0240613 A1* | 10/2008 | Dietz | G02B 21/367 382/284 |
| 2009/0208098 A1* | 8/2009 | Yang | G06T 1/60 382/164 |
| 2012/0237107 A1* | 9/2012 | Tawfik | G06K 9/00127 382/133 |
| 2017/0076442 A1* | 3/2017 | Schoenmeyer | G06T 7/0012 |
| 2018/0012360 A1* | 1/2018 | Bredno | G06K 9/0014 |
| 2018/0061066 A1* | 3/2018 | Frise | C12Q 1/6869 |
| 2018/0349554 A1* | 12/2018 | Jackson | G06F 19/321 |

* cited by examiner

SYSTEM AND METHOD OF PROCESSING MEDICAL IMAGES

FIELD

This disclosure relates generally to processing medical images for inspection or analysis.

BACKGROUND

Pathologists routinely use microscopes to assess patterns in tissue samples on glass slides. The assessment of these patterns, which may indicate the presence or aggressiveness of malignancies for example, is often critical to the diagnosis of disease in humans and animals. Because human observers conduct such assessments, they are subjective. Subjectivity in diagnosis can lead to misdiagnosis, which negatively impact patients, care providers, and payers.

Specialized instruments called whole-slide scanners can capture an image of the tissue sample on a glass slide that has resolution and clarity equivalent to that provided by a microscope. Whole slide scanners output whole-slide images that can be viewed on a computer workstation and analyzed by software. Image analysis software promises to reduce or eliminate subjectivity in diagnosis. However, due to their large size (ranging from hundreds of megabytes to dozens of gigabytes), whole slide images are not trivial for computer systems to manipulate and analyze. Thus, computer processing of whole slide images in acceptable time frames remains a long-standing problem in the art.

SUMMARY

According to some embodiments, computer-implemented method of processing medical images is presented. The method includes accessing an electronically stored at least one medical image; electronically representing a plurality of overlapping tiles that cover the at least one medical image, each overlapping tile of the plurality of overlapping tiles comprising a non-overlapping inner portion and an overlapping marginal portion; in parallel, and individually for each of a plurality of the overlapping tiles: applying a segmentation process to identify objects in the at least one medical image; identifying inner object data representing at least one inner object that is contained within an inner portion of at least one tile; and identifying marginal object data representing at least one marginal object that overlaps a marginal portion of at least one tile; merging at least some of the marginal object data to produce merged data; and outputting object data comprising the inner object data and the merged data.

Various optional features of the above embodiments include the following. The at least one medical image may include a whole slide image; and the object data may represent at least one: cell nucleus, cell nucleoli, gland, tumor, or image artifact. The merging at least some of the marginal object data may include: splitting marginal object data for at least one pair of overlapping objects to produce split object data; stitching together the split object data to produce stitched object data; and smoothing the stitched object data. The method may further include recursively merging at least some of the marginal object data for at least one pair of overlapping objects that are included in more than two of the plurality of overlapping tiles. The method may include, in parallel, and individually for each of a plurality of the overlapping tiles, applying a stain normalization process. The method may further include causing at least a portion of the at least one medical image overlaid by at least a portion of the object data to be displayed. The method may further include building a spatial access tree structure from the object data. The method may further include removing object data from the spatial access tree structure; storing the object data in persistent memory; providing, over a computer network, the spatial access tree structure to at least one client computer, whereby the at least one client computer queries the spatial access tree structure with bounding box data and receives identifying data for at least one included object included within a bounding box represented by the bounding box data; receiving query data from the at least one client computer, the query data comprising the identifying data for the at least one included object included within the bounding box represented by the bounding box data; and providing object data for the at least one included object included within the bounding box represented by the bounding box data. The method may further include declustering the object data to split at least one identified object into at least two disjoint objects. The declustering may include: computing curvature data for at least one clustered object represented by the object data; determining, based on the curvature data, that the at least one clustered object is a clustered object; and applying an adaptive watershed technique to the at least one clustered object, whereby the at least one clustered object is split into at least two unclustered object.

According to various embodiments, a system for processing medical images is presented. The system includes an electronic persistent memory and at least one electronic processor. The electronic persistent memory is configured to store at least one medical image. The at least one electronic processor is configured to electronically represent a plurality of overlapping tiles that cover the at least one medical image, each overlapping tile of the plurality of overlapping tiles comprising a non-overlapping inner portion and an overlapping marginal portion. The at least one electronic processor is further configured to, in parallel, and individually for each of a plurality of the overlapping tiles: apply a segmentation process to identify objects in the at least one medical image; identify inner object data representing at least one inner object that is contained within an inner portion of at least one tile; and identify marginal object data representing at least one marginal object that overlaps a marginal portion of at least one tile. The at least one electronic processor is further configured to perform: merging at least some of the marginal object data to produce merged data; and outputting object data comprising the inner object data and the merged data.

Various optional features of the above embodiments include the following. The at least one medical image may include a whole slide image; and the object data may represent at least one: cell nucleus, cell nucleoli, gland, tumor, or image artifact. The merging at least some of the marginal object data may include: splitting marginal object data for at least one pair of overlapping objects to produce split object data; stitching together the split object data to produce stitched object data; and smoothing the stitched object data. The at least one electronic processor may be further configured to recursively merge at least some of the marginal object data for at least one pair of overlapping objects that are included in more than two of the plurality of overlapping tiles. The at least one electronic processor may be further configured to, in parallel, and individually for each of a plurality of the overlapping tiles apply a stain normalization process. The at least one electronic processor may be further configured to cause at least a portion of the at least one medical image overlaid by at least a portion of the object data to be displayed. The at least one electronic processor may be further configured to build a spatial access tree structure from the object data. The at least one electronic processor may be further configured to: remove object data from the spatial access tree structure; store the object data in the electronic persistent memory; provide, over a computer network, the spatial access tree structure to at least one client computer, whereby the at least one client computer queries the spatial access tree structure with bounding box data and receives identifying data for at least one included object included within a bounding box represented by the bounding box data; receive query data from the at least one client computer, the query data comprising the identifying data for the at least one included object included within the bounding box represented by the bounding box data; and provide object data for the at least one included object included within the bounding box represented by the bounding box data. The at least one electronic processor may be further configured to decluster the object data to split at least one identified object into at least two disjoint objects. The at least one electronic processor may be further configured to decluster the object data to split the at least one identified object into at least two disjoint objects by: computing curvature data for at least one clustered object represented by the object data; determining, based on the curvature data, that the at least one clustered object is a clustered object; and applying an adaptive watershed technique to the at least one clustered object, whereby the at least one clustered object is split into at least two unclustered object.

BRIEF DESCRIPTION OF THE DRAWINGS

Various features of the examples can be more fully appreciated, as the examples become better understood with reference to the following detailed description, when considered in connection with the accompanying figures, in which.

DETAILED DESCRIPTION

Reference will now be made in detail to the disclosed examples, which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific examples. These examples are described in sufficient detail to enable those skilled in the art to practice them and it is to be understood that other examples may be utilized and that changes may be made without departing from the scope of the disclosure. The following description is, therefore, merely exemplary.

Automated computer processes to identify objects of interest in medical images. Non-limiting examples of such objects of interest include cell nuclei, cell nucleoli, glands, tumors, and image artifacts, e.g., scanner artifacts or dust on an imaging lens. The automated object detection processes may accept an image as input, along with some parameters that control sensitivity or specificity of the processes. The process' output may be a list of numbers or statistics quantifying particular properties of the image, and/or a list (and characteristics) of objects of interest in the image. These objects may themselves be the source of any statistics generated. In many cases, the list of objects outputted by the algorithm could be very long: for example, a whole slide image with just a few sections of tissue could contain anywhere from 500,000 to 1,000,000 detectable nuclei. A process designed to detect nuclei, for example, if executed on such an image, would yield as many objects of interest. While the nuclei are detectable by algorithm or by a human viewing the image, they are only detectable at relatively high magnification.

A human viewer may wish to interact with a computer-displayed (digitized) whole slide image in a way analogous to the way she would interact with a glass slide on a microscope: just as a human would move the slide on the microscope stage and switch between objectives of varying magnification powers, a human viewer may wish zoom and pan throughout a whole slide image on a computer display. In either viewing modality, at high magnification, only small portions of the slide or image can be viewed at once. For example, a whole slide image viewing application could display small field of view at high magnification, allowing the human viewer to differentiate between different nuclei or small objects of interest. If a process to detect all nuclei in the image had been run, 750,000 nuclei had been detected throughout the entirety of the image, and the human viewer wished to visualize the highlighted objects in the viewing application in the aforementioned small field of view, the viewing application would have to search through the entire list of 750,000 nuclei in order to find those present in the small field of view, and then render just those objects as overlays on top of the image.

It would be prohibitively computationally expensive to render all 750,000 objects simultaneously and re-render each whenever the slightest zoom or pan movement was initiated by the human controlling the viewing application. Even if rendering all objects simultaneously without regard for their spatial location in the image were somehow possible, because the objects can only be visually differentiated in small fields of view at high magnification, the vast majority of the computational resources expended for rendering all objects would be wasted. Further, a list of 750,000 objects, and associated metadata or statistics about each object can require a non-negligible amount of persistent storage, perhaps on the order of hundreds of megabytes, even compressed. Even if rendering all the objects simultaneously were somehow possible, potentially hundreds of megabytes describing all the objects would have to be read in over disk or network, inducing undesirable and annoying latency.

A partial, but problematic, solution for this problem is to render object information as an image overlay. Instead of transferring each object, a snapshot of the image objects is taken and shown to the user over top of the image itself. However, this approach does not allow the user of the software to interact with the medical objects themselves.

That is, in this approach, the object data is not selectable, manipulable, or otherwise amenable to usage by a human user.

Some embodiments provide a technique to quickly query a large set of objects for a subset that are visible in a given field of view. According to some embodiments, the full set of objects are not loaded into the viewing application's main memory; the full set may reside in persistent storage over a network at a remote server, allowing the viewing application to load only the subsets needed to satisfy the human viewer's requests at any given time. Moreover, the objects displayed to a user according to this approach are fully manipulable by a human user. Such objects may be selected, annotated, etc.

Some embodiments utilize compression in a manner that balances between speed of transfer over the network and spatial density of the objects. Such embodiments may utilize a spatial access data structure at a client computer to determine which compressed chunk is associated with which spatial region of an image. If the data is not spatially dense, or overlaps with many other compressed chunks, then many other compressed chunks must be retrieved from the remote server in order to comprehensively display the markups within a bounding region of the image. The extraneous retrievals reduce the value of grouping the data into chunks in the first place. Thus, some embodiments use spatial access tree data structures to handle storage and access of objects in medical images to intelligently organize the object data such that the components in each compressed chunk are dense. Moreover, the data structure is used as an index to the compressed chunks to accommodate searches of arbitrary regions. Such embodiments may take as an input a region of a whole slide image where objects are to be shown, and use the spatial access tree to provide a reference to the chunks of compressed data that contain the image objects contained within that region.

After clumping image-object data into dense chunks, the data structure may be reorganized to treat the compressed chunks of data as individual spatial objects in order to increase lookup efficiency. In particular, once the data structure organizes image object data into spatial regions, these regions may be removed, compressed, and repurposed as a separate data structure with an associated spatial region containing all markup objects inside the region. After removing the objects, the spatial access data structure may be used as an index for the compressed chunks stored on a remote server. The aggregate objects are very small in size relative to markup objects, and therefore make the transfer of the index spatial access data structure to the user very fast and efficient.

The following provides a summary of some embodiments. An automated object detection process may be executed on a digitized whole slide image, generating a list of potentially several hundred thousand objects, each with its own spatial location/coordinates relative to the image. This list of objects/markups is inserted into a data structure that provides for querying objects by spatial location (e.g., a spatial access tree data structure). An example of such a data structure is an R-tree. After the objects are inserted into the spatial access tree data structure using the approximate insertion procedure for the particular data structure, the resulting data structure has leaf nodes that are "chunks" of objects, e.g., 100-500. This means that a query on the tree for all objects within a particular range will return a set of "chunks", as opposed to a set of objects. This abstraction and grouping is useful, because the objects and their associated metadata are large in terms of storage/memory footprint. When persisting the tree data structure, to include all the objects and object metadata would negate the advantages of this process. It would mean that to run spatial queries on the data structure, the entire data structure and its constituent objects would have to exist in local memory, which could be prohibitively expensive. Instead, some embodiments remove the chunks of objects from the tree and store them consecutively in a separate file (e.g., chunk-data-file), which can be quite large. Those chunks, although not stored in the persisted tree data structure, are referenced by it. For instance, a leaf node that refers to a chunk will indicate the location and size of the chunk data in the chunk-data-file. The result is a very lightweight tree data structure that functions as an index, or lookup-table, and can be loaded nearly instantaneously by a client application. The larger chunk-data-file need not be loaded in its entirety because the client application can request from the remote server that stores the chunks only the chunks its needs to using the information in the index. The tree data structure can be persisted as JSON or XML, for example, for easy parsing by the client application.

Figure 1:
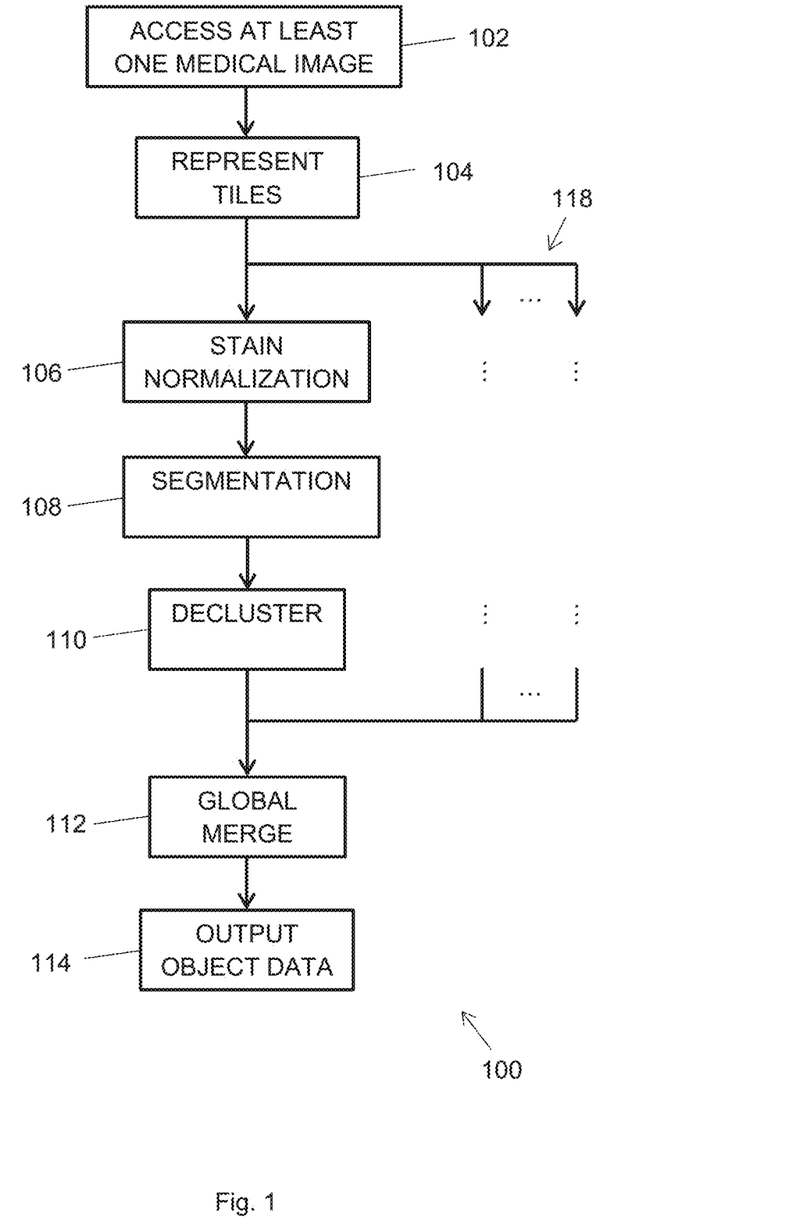
FIG. 1 is a flow diagram of a method for processing a medical image.

FIG. 1 is a flow diagram of a method 100 for processing a medical image. Method 100 will be described with respect to FIG. 1 and in reference to the other figures. Method 100 may be implemented using a computing system as shown and described below in reference to FIG. 6.

At block 102, method 100 accesses at least one electronically stored medical image. The medical image may be a digitized whole slide image, for example. Alternately, the medical image may be an MRI, CT, or other image. Method 100 may access the image by retrieving it from a remote server over a network such as the internet, for example.

At block 104, method 100 represents the medical image as a plurality of overlapping tiles. The actions of this and subsequent blocks permit the parallelization of the processing, prevent memory errors caused by complex computation, and achieve more than thirty times speedup on any given algorithm. In particular, medical images such as whole slide images encode massive amounts of heterogeneity due to, for example, tissue types, scanning variability and staining artifacts. Splitting a given whole slide image into tiles and processing each tile with different parameters based on local heterogeneity not only reduces the computation complexity, but also improves the analytical accuracy.

Figure 2:
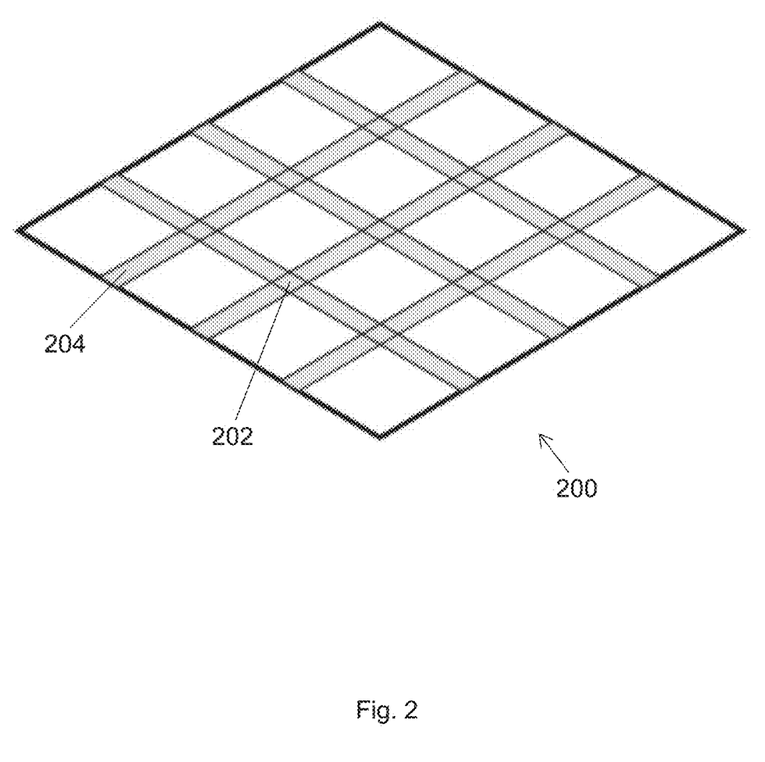
FIG. 2 is a schematic diagram illustrating tiling a medical image according to some embodiments.

FIG. 2 is a schematic diagram illustrating tiling 200 a medical image according to some embodiments. That is, FIG. 2 illustrates schematically an overlapping tiling 200 that may be implemented per block 102 of FIG. 1. As depicted at an angle for viewing ease, tiling 200 breaks up the medical image into a plurality of overlapping tiles. As shown, shading in FIG. 2 indicates overlap. This, shading 204 indicates an overlap from two tiles, and shading 202 indicates overlap from four tiles.

Define term L as representing the width of the overlapping regions of two adjacent tiles. Any tile that does not locate on one of the four borders of the whole slide image will have four "epsilon margins", i.e., margins of width epsilon. For an input whole slide image that is a W by H on level 0 (40× objective), then the total number N of the tiles is may be represented as follows, by way of non-limiting example:

$$N = \frac{\lceil W - \varepsilon \rceil \cdot \lceil H - \varepsilon \rceil}{l^2} \qquad (1.1)$$

The tiling of block 102 is particularly useful in the context of segmentation. Tiling as disclosed eliminates the segmentation of incomplete objects (e.g., nuclei) caused by tile boundaries, because adjacent tiles overlap with each other on one side, and both of them will perform segmentation on the common regions. Therefore the information of the nuclei (or other objects of interest) located near tile borders will be collected by both neighboring tiles, the actions of block 112 essentially summarize the results returned from both tiles and come up with a conclusive answer.

Once the tiles are defined per block 104, method 100 may proceed by processing individual tiles in parallel, as depicted by the arrows and ellipses 116 of FIG. 1. Each such arrow indicates that multiple separate flows may be used to perform the actions of blocks 106, 108, and 110 on a plurality of tiles simultaneously. Accordingly, electronic computers that utilize one or more parallel processors may be used to implement at least the actions of blocks 106, 108, and 110.

At block 106, a tile undergoes stain normalization. In general, medical images may contain mass amounts of heterogeneity due to imaging artifacts, staining errors, tissue types, scanning variability, and naturally occurring entropy due to human error in the tissue handling process. Accordingly, the tiles may be independently subjected to an adaptive stain normalization process at this block. One or more parallel processors may be used to independently implement stain normalization on each of a plurality of tiles. An example stain normalization process is disclosed presently in reference to Equations (2.1)-(2.13). The process as described relates to the functions performed on one tile; according to actual embodiments, the process may be performed many times in parallel for many different tiles, that is, essentially simultaneously.

For the stain normalization process, a deconvolution may be used to separate individual stains like hematoxylin and eosin, or many combinations of immunohistochemical stains. In particular, color deconvolution transforms the RGB color space $\Psi$ to a new color space $\hat{\Psi}$, defined by the tissue stains present. If an image $I=(C, \Psi)$ is defined as a 2D set of pixels C with associated color space function $\Psi$ assigning intensities of the individual RGB channels to each pixel, the relationship between $\Psi$ and $\hat{\Psi}$ may be defined as follows, by way of non-limiting example.

$$\Psi = \exp(-W\hat{\Psi}) \quad (2.1)$$

In Equation (2.1), W represents the stain matrix that defines the stain vectors associated with each stain present in the tissue, which may be represented by way of non-limiting example as follows.

$$\begin{bmatrix} \bar{w}_{r,1} & \bar{w}_{g,1} & \bar{w}_{b,1} \\ \bar{w}_{r,2} & \bar{w}_{g,2} & \bar{w}_{b,2} \\ \bar{w}_{r,3} & \bar{w}_{g,3} & \bar{w}_{b,3} \end{bmatrix} \quad (2.2)$$

In Term (2.2), the $\bar{w}_{r,i}$, $\bar{w}_{g,i}$, and $\bar{w}_{b,i}$ are the predefined RGB values for the $w_i$ channel. A closed form solution to the inversion of Equation (2.1) may be used to deconvolve an individual stain vector. This solution follows by showing the intensity of a pixel $c \in C$ in the new colorspace $\hat{\Psi}$ may be defined, by way of non-limiting example, as follows.

$$\hat{\Psi}(c) = D\Phi(c) \quad (2.3)$$

According to Equation (2.3), the following hold.

$$D = W^{-1} \quad (2.4)$$

$$\Phi(c) = -\log(\Psi(c)) \quad (2.5)$$

In the above, D is the color deconvolution matrix derived by calculating the inverse of the stain matrix W; $\Phi$ is the optical density space where a linear combination of stains results in a linear combination of OD values; and $\hat{\Psi}(c)$ represents the amount of each stain ($w_1$, $w_2$, $w_3$) corresponding to a pixel c. The value of W may be set as an international standard for hematoxylin deconvolution, according to some embodiments.

Given the training image set of n images $I=\{I_1, I_2, \ldots, I_n\}$, with m from one institution, and k from another, the actions of block 106 aims to eliminate stain variability from the model such that a non-linear color mapping onto the respective images may be performed by mapping to a target stain. Without elimination of the stain variability, the heterogeneity of the stains may introduce bias and possibly even inducing a bimodal stain vector color distribution.

The stain normalization of block 106 proceeds by converting the RGB signal to a perception-based color space $l\alpha\beta$. However, $l\alpha\beta$ is a transform of the LMS space, so the signal conversion may be piecewise. An LMS conversion may be performed according to, by way of non-limiting example:

$$\begin{bmatrix} L \\ M \\ S \end{bmatrix} = \begin{bmatrix} 0.3811 & 0.5783 & 0.0402 \\ 0.1967 & 0.7244 & 0.0782 \\ 0.0241 & 0.1288 & 0.8444 \end{bmatrix} \begin{bmatrix} R \\ G \\ B \end{bmatrix} \quad (2.6)$$

In order to eliminate skew in this color space, some embodiments may convert to a logarithmic cone space, using the following, by way of non-limiting example.

$$\mathcal{L} = \log(L)$$

$$\mathcal{M} = \log(M)$$

$$\mathcal{S} = \log(S) \quad (2.7)$$

Some embodiments use a cross-section of naturally occurring images to decorrelate these axes. Some embodiments compute maximal decorrelation between three axes using principal component analysis. This results in three orthogonal principal axes with pseudo-integer coefficients that we approximate with the following transform:

$$\begin{bmatrix} l \\ m \\ s \end{bmatrix} = \begin{bmatrix} \frac{1}{\sqrt{3}} & 0 & 0 \\ 0 & \frac{1}{\sqrt{6}} & 0 \\ 0 & 0 & \frac{1}{\sqrt{2}} \end{bmatrix} \begin{bmatrix} R \\ G \\ B \end{bmatrix} \quad (2.8)$$

Some embodiments consider the $\mathcal{L}$ channel as red, the $\mathcal{M}$ channel as green, and $\mathcal{S}$ as follows.

Achromatic $\propto r+g+b$

Yellow-blue $\propto r+g-b$

Red-green $\propto r-g$ (2.9)

In such embodiments, the l axis represents an achromatic color channel, and the $\alpha$ and $\beta$ channels represent chromatic yellow-blue and red-green opponent channels, respectively. In this space, the data is symmetrical and compact, and decorrelation to higher than second order is achieved. Note that the achromatic axis of this color space is orthogonal to the equiluminant plane.

In order to have some aspects of the distribution of data points in lαβ space to transfer between images, some embodiments compute the mean and standard deviation along each axis independently. Thus, such embodiments compute these measures for both the source and the target image. To do so, subtract the mean from the data points as follows.

$$l^* = l - \langle l \rangle$$
$$\alpha^* = \alpha - \langle \alpha \rangle$$
$$\beta^* = \beta - \langle \beta \rangle \quad (12.0)$$

Next, scale the respective standard deviations, e.g., as follows.

$$l' = \frac{\sigma_t^l}{\sigma_t^l} l^* \quad (2.11)$$
$$\alpha' = \frac{\sigma_t^\alpha}{\sigma_t^\alpha} \alpha^*$$
$$\beta' = \frac{\sigma_t^\beta}{\sigma_t^\beta} \beta^*$$

This scaled distribution can be scaled back to RGB space, in order to view the transformed source image in its original context. This may be accomplished by approximation with the following transform, for example.

$$\begin{bmatrix} L \\ M \\ S \end{bmatrix} = \begin{bmatrix} 1 & 1 & 1 \\ 1 & 1 & -1 \\ 1 & -2 & 0 \end{bmatrix} \begin{bmatrix} \frac{3}{\sqrt{3}} & 0 & 0 \\ 0 & \frac{6}{\sqrt{6}} & 0 \\ 0 & 0 & 2 \end{bmatrix} \begin{bmatrix} l \\ \alpha \\ \beta \end{bmatrix} \quad (2.12)$$

Applying Equation (2.12) and raising the pixel values by a power of 10 to transform out of logarithmic space back into linear space can be used to convert the image data from LMS to RGB using the following, by way of non-limiting example.

$$\begin{bmatrix} R \\ G \\ B \end{bmatrix} = \begin{bmatrix} 4.4679 & -3.5873 & 0.1193 \\ -1.2186 & 2.3809 & -0.1624 \\ 0.0497 & -0.2439 & 1.2045 \end{bmatrix} \begin{bmatrix} L \\ M \\ S \end{bmatrix} \quad (2.13)$$

At block 108, a tile undergoes segmentation to detect and identify objects of interest. One or more parallel processors may be used to independently implement the segmentation on each of a plurality of tiles. Essentially any segmentation process that identifies objects of interest in the tiles may be used. For example, all the RGB tiles (the alpha channel may be removed to reduce storage space) generated from the whole slide images may be distributed among the parallel workers, local segmentation may be conducted on each tile, and segmentation parameters may be chosen based on the heterogeneity of each tile. The output of block 108 is raw, potentially improperly clustered and disjoint, object data. The improper clustering may be accounted for at block 110, and the disjoint nature of the raw object data is resolved at block 112.

At block 110, the raw object data obtained at block 108 is declustered to remove improperly clustered objects. One or more parallel processors may be used to independently implement the declustering process on each of a plurality of tiles. An example declustering process is presented below in reference to FIG. 3.

Figure 3:
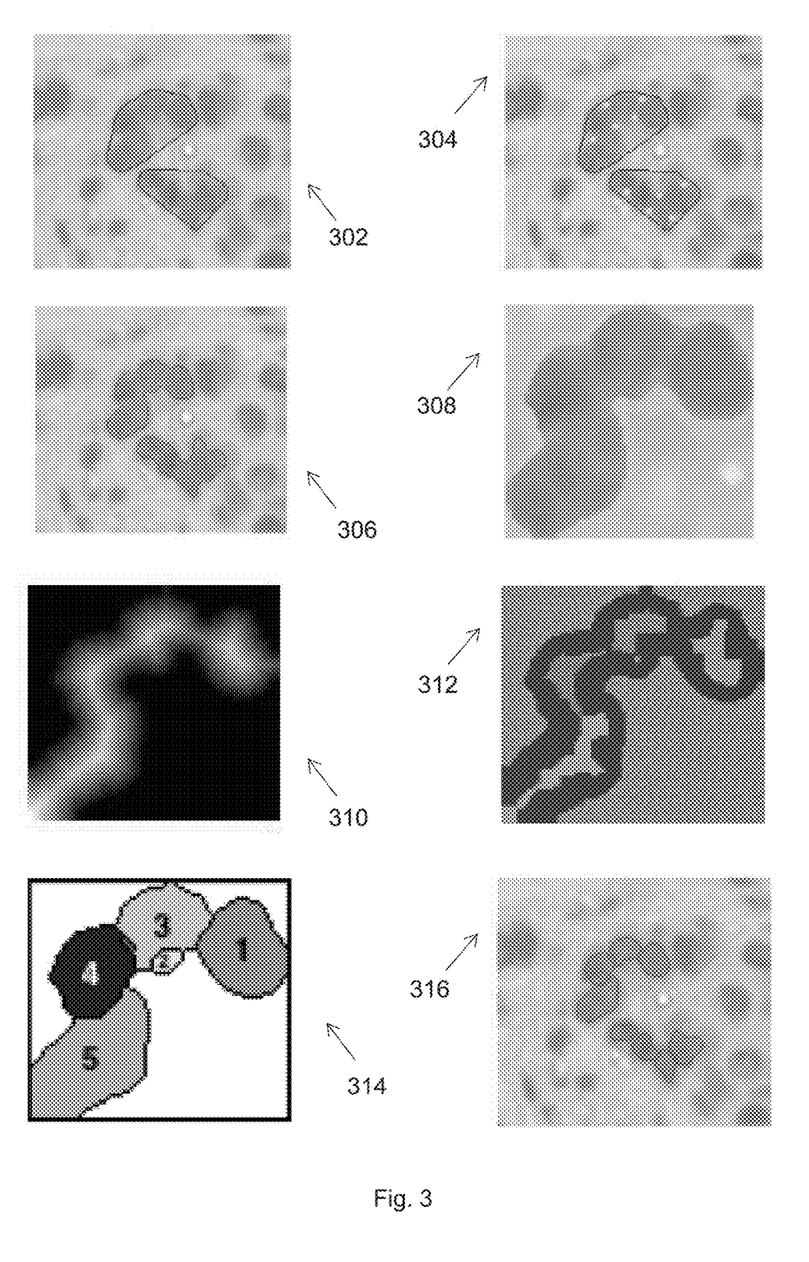
FIG. 3 depicts several images illustrating an object declustering process according to some embodiments.

FIG. 3 depicts several images illustrating a declustering process according to some embodiments. On large-scale image segmentation, due to staining noise and intrinsic image heterogeneity, for example, clusters are often inevitable. Therefore, post-segmentation declustering may be applied to more accurately represent proportion and shape statistics of objects such as nuclei. The following presents highly scalable techniques for both detecting clusters and declustering clusters. Both techniques are particularly suited for distributed computing environments.

By way of notation, the segmented contours can be represented as closed level curves that contain a set of three-dimensional points in clockwise order:

$$C(t) = \{(x,y,z) \in \mathbb{R}^3 | f(x,y,z) = c\} \quad (3.1)$$

In Equation (3.1), c denotes a constant, x and y represent the geometric properties of each pixel, z represents the RGB channel vector, and the variable t represents the index of each point. When considering only the geometric transformation of the contours, the function above can be simplified as:

$$C(t) = \{(x,y) \in \mathbb{R}^2 | f(x,y) = c\} \quad (3.2)$$

Either Equation (3.1) or Equation (3.2) may be used where appropriate, depending on context, in the following.

A cluster detection technique is described presently. Given a potentially clustered contour C, let a and l denote the area and perimeter of C, respectively. Then the circular form factor may be represented as, by way of non-limiting example:

$$\xi = \frac{l^2}{4\pi a} \quad (3.3)$$

According to some embodiments, if a>α and ξ>ζ then C is considered a cluster. The parameters α and ζ are selected by a user under various settings. Otherwise, the contour may be further analyzed according to the following procedure.

Determine a convex polygon P approximating curve C. An example is shown in depiction 302 of FIG. 3. The curvature vector $\vec{K}$ of the given contour may be represented as, by way of non-limiting example:

$$\vec{K} = \frac{\left| \frac{d\vec{x}^2}{dt} \cdot \frac{d\vec{y}^2}{dt} - \frac{d\vec{x}^2}{dt} \cdot \frac{d\vec{y}^2}{dt} \right|}{\left( \frac{d\vec{x}}{dt} \cdot \frac{d\vec{x}}{dt} + \frac{d\vec{y}}{dt} \cdot \frac{d\vec{y}}{dt} \right)^{\frac{3}{2}}} \quad (3.4)$$

In Equation (3.4), $\vec{x} = \{x_i | i=1, 2, \ldots, n\}$, and $\vec{y} = \{y_i | i=1, 2, \ldots, n\}$, wherein $|C|=n$. That is, the curve representing an object may be electronically stored as two n-dimensional vectors representing the piecewise coordinates of the constituent pixels.

Denote the set of local minima points on curve C as follows, by way of non-limiting example:

$$\phi = \{C(t) | \vec{K}(C) = 0\} \quad (3.5)$$

Depiction 304 of FIG. 3 illustrates example local minima (depicted as light dots) graphically.

Let d(p,P) represent the minimum distance from point p to polygon P, and define a concave factor by way of non-limiting example as follows.

$$D = \frac{\sum_{p \in \phi} d(p, P)}{\sum_{p \in \phi} 1} \quad (3.6)$$

If $D > \delta$, according to some embodiments, then contour C is considered to be a cluster. The value of $\delta$ is controlled by empirical factors and may be user-selectable. Two example clusters identified through the use of Equation (3.6) as described are shown in depiction 306 of FIG. 3.

Having presented a cluster detection technique above, a declustering technique is described presently. The declustering technique may be applied to the clusters detected according to the above-described cluster detection technique. The declustering technique may be performed at target regions around clusters, which makes it particularly adaptable for distributed computation. Specific parameters may be selected using pretrained regression models. New contours constructed from declustering may be automatically evaluated.

According to some embodiments, for each given clustered contour C, the minimum bounding region B is extracted. Let N represent the set of all pixels outside the boundary of C, and let R represent the set of pixels within and on the boundary of C. Therefore, according to some embodiments:

$$B = N \cup R \quad (3.7)$$

In order to achieve better declustering, items such as nucleii, tissues, and potential staining noises in region N, may be removed using the two processes described below.

1) Contrast Adjustment: Let I denote the intensity function that takes coordinate (x, y, z) as variables:

$$I(x, y, z) = \sum_{i=0}^{2} z_i \quad (3.8)$$

In Equation (3.8), (x, y, z) is in C. The intensity values range from 0 to 255, where 0 is the darkest (black) and 255 is the lightest (white). To remove noises from N, all the pixels with intensity lower than threshold $\theta$ will be replaced by a new background color c. This action may be symbolically represented as follows, by way of non-limiting example.

$$z = \begin{cases} c, & \text{if } I(x, y) < \theta \\ z, & \text{otherwise} \end{cases} \quad (3.9)$$

In Equation (3.9), color c of each target region may be defined as the RGB values of the pixels with the highest intensity in region R, which may be expressed as follows, by way of non-limiting example.

$$I(x^*, y^*, c) = \max_{(x,y,z) \in R} I(x, y, z), (x^*, y^*, c) \in R \quad (3.10)$$

2) Background Blurring: After removing the dark objects and lower the contrast in the background, region N may be further smoothed using Gaussian filtering. The blurring kernel $G_a$ may be expressed as follows, by way of non-limiting example:

$$G_a(x, y) = \frac{1}{2\pi\sigma^2} e^{-\frac{x^2+y^2}{2\sigma^2}} \quad (3.11)$$

In Equation (3.11), (x, y) is from N. The intensity after blurring at pixel (x, y) with a 7×7 window may be expressed as follows, by way of non-limiting example:

$$I'(x, y) = \sum_{i=-3}^{3} \sum_{j=-3}^{3} G_{\sigma(i,j)} I(x+i, y+j) \quad (3.12)$$

In Equation (3.12), (x, y) is from N. This concludes the description of background blurring, and with it, the description of removing artifacts from region N of pixels outside of the boundary of contour C. An example extracted and cleaned (i.e., artifact-removed) target region is shown in depiction 308 of FIG. 3.

The next step in declustering according to some embodiments is adaptive thresholding. Given a cluster C, an adaptive binary thresholding procedure may be conducted on the target bounding region B of C. Otsu's method may be applied here to determine the baseline threshold that minimizes weighted intra-class variance. Let $\tau$ denote some intensity threshold that divides the pixels in region B into two categories, $P_1$ and $P_2$. Thus:

$$\tau^* = \underset{\tau}{\arg\min} \sigma_P^2(\tau) \quad (3.13)$$

$$\sigma_P^2(\tau) = w_{P_0}(\tau) + w_{P_1}(\tau)\sigma_{P_2}^2(\tau)$$

$$\sigma_P^2(\tau) = w_{P_0}(\tau)\sigma_{P_1}^2(\tau) + w_{P_1}(\tau)\sigma_{P_2}^2(\tau) \quad (3.13)$$

In Equations (3.13), weights $w_{P_0}(\tau)$ and $w_{P_1}(\tau)$ may be computed from gray-level histograms of B.

For each cluster C and its outer and inner regions N and R, the following features may be extracted:
1) mean, maximum, minimum intensities of N
2) mean, maximum, minimum intensities of R
3) intensity variance of N
4) intensity variance of R
5) circular form factors of C
6) area of C Additionally, local heterogeneity features for region B may be extracted using an Adaptive Local Morphological Scale (ALMS) technique. A suitable technique may model local heterogeneity across a whole slide image in order to adaptively change parameters for nuclear segmentation that are dependent on local image properties. Such a technique may model the local heterogeneity of a whole slide image using rotational, scale, and color space invariant computations. A variation on Otsu's two-dimensional thresholding technique may be used. Namely, define an Otsu coefficient as a scalar multiplier of the threshold value for binarization computed through Otsu's known binarization process. In particular, define Otsu's Coefficient $\psi \in (0, 5]$ to be the scalar multiplier of Otsu's threshold $\mu$, an intensity threshold in grayscale space, such that $\mu_f = \psi \mu_i$, where $\mu_f$ represents an intensity threshold in grayscale space transformed with respect to the local heterogeneity properties of the tile. Next, build a model to adaptively produce $\psi$ for every tile across the whole slide image. The pre-segmentation processing, which aims at predicting the best $\psi$ for each tile in a given whole slide image, may include the following steps:

1) Emanate eight radial trajectories from the tile center.
2) Construct a polygon representing local heterogeneity in a physics system.
3) Extract heterogeneous features which are closely related to nuclear distribution in each tile.
4) Feed heterogeneous features to the pretrained Otsu coefficient predictor.
5) Set the $\psi$ to be the predictor output, which adapts to the current tile.

The predictor may be a linear regression model built using cropped tiles from a known image. The features extracted using the ALMS technique may then be fed into a pretrained Bayesian ridge regression model to predict the best coefficient $\sigma$, which is later multiplied to the baseline threshold $\tau^*$.

Thus the final threshold value according to some embodiments is $\sigma\tau^*$, where $\sigma$ is adaptively chosen based on the local heterogeneity of each given cluster. The search for $\tau^*$ may be implemented based on an algorithm that optimizes the sensitivity and specificity of the objects detected.

The next step in declustering according to some embodiments is applying a transformation. Let G denote the adaptive thresholding result of B. Then the distance transformation D on G may be defined as follows, by way of non-limiting example.

$$D(p) = \min_{q \in G} d(p, q) \qquad (3.14)$$

In Equation (3.14), p is taken from G, and d(p, q) denotes the Euclidean distance between points p and q. The transformation may be implemented based on the algorithm described in, for example, Felzenszwalb, Pedro, and Daniel Huttenlocher, *Distance transforms of sampled functions*, Cornell University, 2004. Afterwards, D may be further transformed using Equation (3.15) below into E. Let b denote the binary structuring of D, which may be represented as follows, by way of non-limiting example.

$$E(p) = (D \ominus b)(p) = \min_{q \in N_p} [D(p+q) - b(q)] \qquad (3.15)$$

In Equation (3.15), p is from B, and $N_p$ denotes the neighborhood of p. An example result of applying a distance transform as disclosed appears in depiction 310 of FIG. 3.

The next step in declustering according to some embodiments is performing a connected component analysis. Given the transformation result E, connected component analysis may be applied to search for foreground object markers. A suitable connected component analysis is that described in Wu, Kesheng, Ekow Otoo, and Arie Shoshani, *Optimizing connected component labeling algorithms*, Medical Imaging, International Society for Optics and Photonics, 2005. Example detected markers are shown in depiction 312 of FIG. 3, where he light and dark gray areas represent background and unknown regions, respectively.

The next step in declustering according to some embodiments is performing a marker-controlled watershed. That is, in order to avoid over-segmentation and improve efficiency, a marker-controlled watershed algorithm may be used. The flooding process on image G starts from the set of foreground markers described above. The gradient vectors of G in x and y directions may be represented as follows, by way of non-limiting example:

$$\nabla G = (G_x, G_y) = \left(\frac{\partial G}{\partial x}, \frac{\partial G}{\partial y}\right) \qquad (3.16)$$

Therefore, the gradient magnitude may be represented as follows, by way of non-limiting example.

$$\|\nabla G\| = \sqrt{G_x^2 + G_y^2} \qquad (3.17)$$

Given each foreground marker M, let $N_M$ denote the neighboring pixels of M, $N_p$ denote the neighborhood of a given pixel p, l(p) be the label of p, and c be a constant value. The flooding process may be performed using Algorithm 1, below, for example.

---
Algorithm 1
---
Sort $\{p \mid p \in N_M\}$ based on $\|\nabla \mathcal{G}(p)\|$ into list P;
while P ≠ ∅ do
   for p ∈ P do
      Check all pixels in $N_p$;
      if ∀q ∈ $N_p$, l(q) == c then
         l(p) = c;
      end
      for q ∈ $N_p$ do
         if l(q) == null then
            Insert q into P based on $\|\nabla \mathcal{G}(q)\|$ :
         end
      end
   end
end
---

Lastly, only the components of reasonable sizes and shapes are kept. For example, as shown in depiction 3.14 of FIG. 3, component 2 may be discarded. A final declustering result is shown in depiction 316 of FIG. 3.

According to some embodiments, the declustering result may be automatically evaluated based on one or more of the following metrics:
1) the intensity of each new contour
2) the circular form factor of each new contour
3) the total area of the new contours If the declustering result is determined as bad, the declustering power may be adjusted, and new contours may be generated based on auto-tuned parameters. For example, if the total area of the new contours is much smaller than the original cluster, and large regions with reasonable intensity values are not covered by the any contours, then the thresholding and filtering degrees may be lowered accordingly.

This concludes the description of a declustering technique according to some embodiments.

As preparation for performing the global merge of block 112 of method 100, the segmented contours may be classified as "inner results" or "marginal results", where the former category represents the contours of the segmented objects of interest that fall outside the four epsilon margins of the tile (see the discussion of FIG. 2, above, regarding "epsilon margins"), and the latter category represents the contours of the segmented objects of interest that locate in or touch the epsilon margins. This preparation may be performed in parallel using a parallel processor. The contours from both categories can be directly mapped to a global image space by adding tile origin offset to the contour coordinates. The mapped inner contours and marginal contours may then be collected separately.

At block 112 of FIG. 1, a global merge is performed. The global merge accepts the results of one or more of blocks 106, 108, and 110, and merges the information from the plurality of tiles (particularly from the epsilon margins thereof) into a complete set of object information for an entire medical image. Thus, the global merging step aims at sort and conclude information from the marginal contours, then replace them with a duplicate-free yet complete set of results. Given the original set of marginal contours, the interior points of each contour (coordinates inside each contour) are extracted, which may be done in parallel. Any two (or more) contours that share multiple interior points may be replaced by a new large contour. This may be performed by taking the union of such contours and recalculating the new contour boundaries of the unions. This way, according to some embodiments, all the overlapped contours are merged and the tiling border effect is eliminated.

Figure 4:
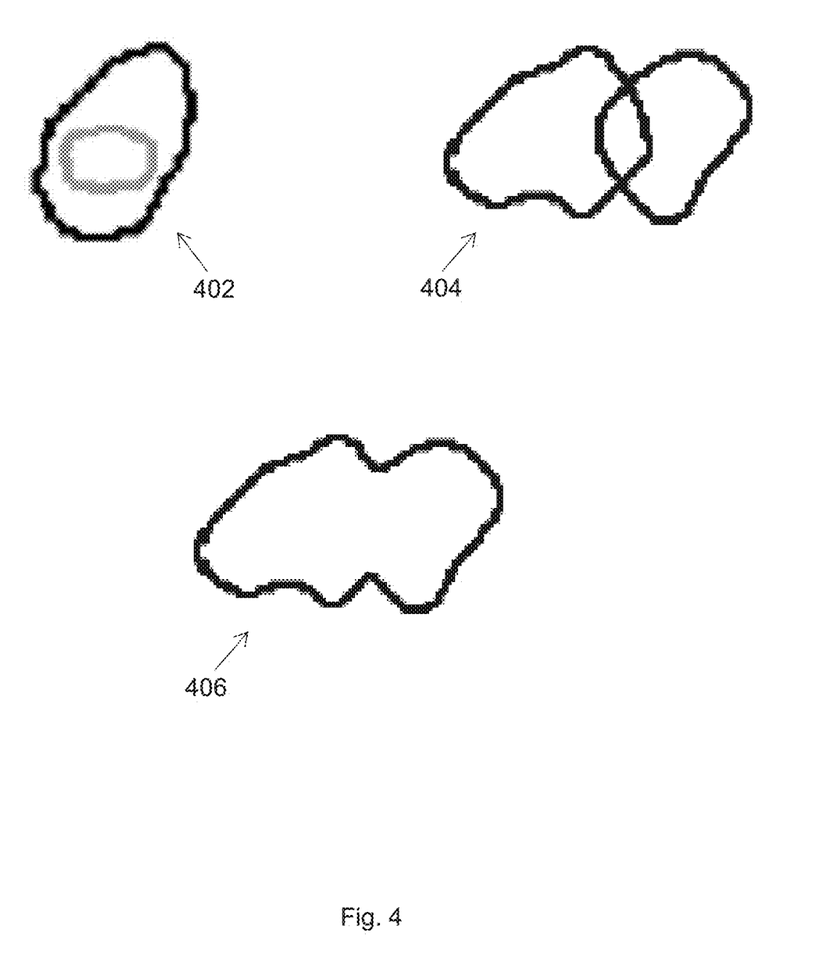
FIG. 4 depicts two types of marginal contours, and a merged contour, according to some embodiments.

FIG. 4 depicts two types of marginal contours, and a merged contour, according to some embodiments. Given a list of marginal contours, consider two scenarios: contours that are completely contained in other contours, as shown by representation 402 of FIG. 4, referred to herein as "parent-child contours", and contours that partially intersect with each other, as shown by representation 404 of FIG. 4, referred to herein as "intersected contours".

Parent-child contours normally occur when the two adjacent tiles are heterogeneously distinctive and have very unique segmentation parameters, which leads to very different segmentation results. In this case, for some embodiments, only the outer parent contour is kept and the inner child contour is discarded.

The more common adjacency relation of marginal contours is that of intersected contours, where two or more contours at least partially intersect with each other. For this adjacency type, an split-stitch-smooth methodology may be applied. The split sub-step, the stitch sub-step, and the smooth sub-step, according to some embodiments, are described in detail below.

For the split sub-step, let C1 and C2 represent two overlapped contours, each containing a list of points, which may be represented as follows, by way of non-limiting example.

$$C_1 = \{(x_{11}, y_{11}), (x_{12}, y_{12}), \ldots, (x_{1m}, y_{1m})\} \quad (4.1)$$

$$C_2 = \{(x_{21}, y_{21}), (x_{22}, y_{22}), \ldots, (x_{2m}, y_{2m})\} \quad (4.2)$$

In Equations (4.1) and (4.2), $|C_1| = m$ and $|C_2| = n$.

According to some embodiments, contours that intersect at only point are not merged. Thus, for any given contour pairs for merging, in such embodiments, there will always be two intersection points $p_1$ and $p_2$, shown in FIG. 4 as depiction 404. Then $p_1$ and $p_2$ may be used as the splitting points for both $C_1$ and $C_2$, which results in two open curves $L_1$ and $L_2$ constructed from the original contours. To calculate $L_1$ from $C_1$, the coordinates of all the points that are within $C_2$ boundary may be extracted from sequence $C_1$. Let $I_1$ and $I_2$ represent the set of the inner points of $C_1$ and $C_2$ respectively. The intersection $C_1 \setminus I_2$ may then be subtracted from $C_1$, and $C_2 \setminus I_1$ may then be subtracted from $C_2$:

$$L_1 = C_1 - C_1 \cap I_2 = \{(x_{11}, y_{11}), \ldots, (x_{p1}, y_{p1}), (x_{p2}, y_{p2}), \ldots, (x_{1m}, y_{1m})\} \quad (4.3)$$

$$L_2 = C_2 - C_2 \cap I_1 = \{(x_{21}, y_{21}), \ldots, (x_{p2}, y_{p2}), (x_{p1}, y_{p1}), \ldots, (x_{2n}, y_{2n})\} \quad (4.4)$$

In Equations (4.3) and (4.4), $p_1 = (x_{p1}, y_{p1})$ and $p_2 = (x_{p2}, y_{p2})$. For purposes of notation, $p_1$ has lower index in $C_1$ sequence, whereas $p_2$ has lower index in the $C_2$ sequence. This concludes the split sub-step.

For the stitch sub-step, given two open curves $L_1$ and $L_2$, stitch them together at the splitting points $p_1$ and $p_2$. First, remove points $p_1$ and $p_2$ from $L_1$, so that no duplicate points exist. This situation may be symbolically represented as follows, by way of non-limiting example.

$$L'_1 = L_1 - \{(x_{p1}, y_{p1}), (x_{p2}, y_{p2})\} \quad (4.5)$$

$$L'_1 \cap L_2 = \emptyset \quad (4.6)$$

Then a new contour L is constructed from $L'_1$ and $L_2$ by sorting all the points in $L'_1 \cap L_2$ in a clockwise order. An example of such a merging result L is shown in depiction 406 of FIG. 4.

For the smooth sub-step, according to some embodiments, each point of the merged contours is examined with an e.g., 5×5 window. Specifically, given each merged contour C, for each point $c \in C$, all 24 pixels in the surrounding neighborhood (e.g., of pixels within two pixel lengths of c, as well as corner elements to form a 5×5 square) may be taken into consideration. Let k denote the number of neighbors that locate inside or on the boundary of C. According to some embodiments, if $k > \zeta$, median filtering is used to smooth away the spike noises; otherwise Gaussian filtering may be applied. Here $\zeta$ represents a sharpness parameter that may be user selectable or determined empirically.

Let I represent the original intensity matrix. Then the new intensity value $I'_M(c)$ at pixel c computed with median filtering may be represented as follows, by way of non-limiting example:

$$I'_M(x_c, y_c) = \text{median}\{I(x, y) | (x, y) \in N\} \quad (4.7)$$

In Equation (4.7), $c = (x_c, y_c)$, and N represents the point coordinates in the 5×5 neighborhood surrounding c.

For Gaussian filtering, the smoothing kernel $G_\sigma$ may be the same kernel defined in Equation (3.11), for example.

The intensity after smoothing at pixel c may be represented as follows, by way of non-limiting example.

$$I'_G(x_c, y_c) = \sum_{i=-2}^{2} \sum_{j=-2}^{2} G_{\sigma(i,j)} I(x_c + i, y_c + j) \quad (4.8)$$

Then the final intensity value may be represented as follows, by way of non-limiting example.

$$I'(c) = \begin{cases} I'_F(x_c, y_c), & \text{if } k > \zeta \\ I'_G(x_c, y_c), & \text{otherwise} \end{cases} \quad (4.9)$$

This concludes the description of the basic global merge of block 112 of method 100. However, in highly clustered regions, sometimes three or more contours, from at most four different tile segmentation, may overlap with each other as shown at 202 in FIG. 2. For such cases, the basic global merge procedure described above may be applied in a recursive way, two of the intersected contours may be merged each time, until no more merging is needed.

At block 114 of method 100, the globally-merged object data is output. The output may be any of a variety of forms. According to some embodiments, the object data, or a portion thereof, is displayed, e.g., superimposed over the original medical image, or corresponding portion thereof. Such embodiments, the display may be used by a medical professional for analysis or review. According to some embodiments, the output is performed by sending the object data to computing machinery for further processing, e.g., building a spatial access data tree, as shown and described below in reference to FIG. 5.

Figure 5:
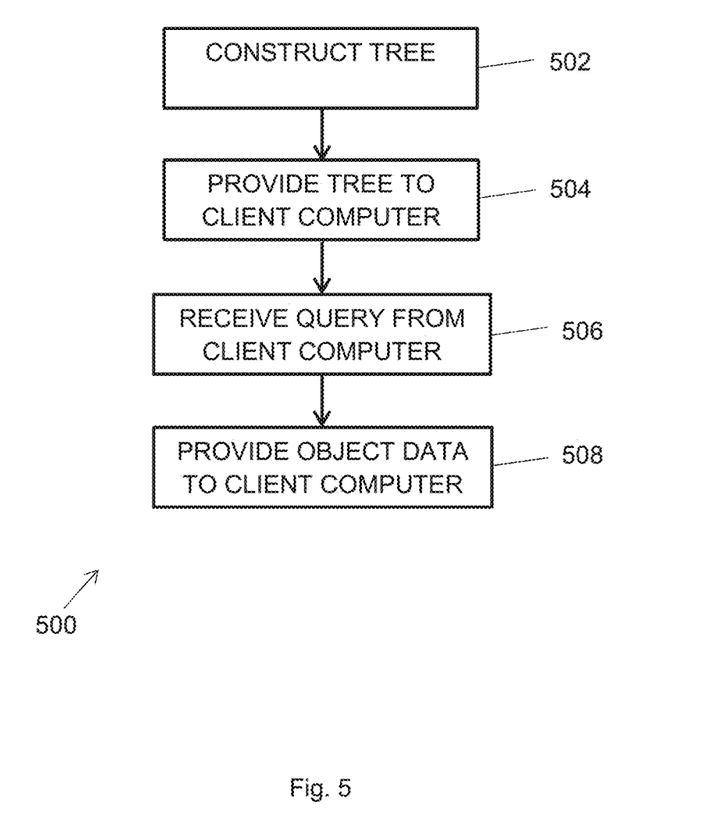
FIG. 5 is a flow diagram of a method for providing medical images in a client-server environment.

FIG. 5 is a flow diagram of a method 500 for providing medical images in a client-server environment. Method 500 may be performed using computing machinery, e.g., as shown and described below in reference to FIG. 6.

At block 502, method 500 constructs a spatial access tree. Such a tree may be an R-tree or R*-tree, for example. The spatial access tree may be constructed from the object data as described below using insertion operations particular to the type of spatial access tree.

In general, the spatial access tree organizes the stored image object data such that the components in each compressed chunk are dense. Additionally, the spatial access tree is used as an index to the compressed chunks to accommodate searches of arbitrary regions. That is, once constructed as disclosed, the spatial access tree may take an input of a region or point where markups need to be shown, and provide the reference to the correct chunks of compressed data that contain the image objects contained within that region.

After clumping medical object data into dense chunks, the spatial access tree may be reorganized to treat the compressed chunks of data as individual spatial objects in order to increase lookup efficiency. Therefore, once the spatial access tree organizes image object data into spatial regions, these regions may be removed from the tree, compressed, and repurposed as objects with associated spatial regions containing all markup objects inside the regions. The tree may be reorganized such that the leaf nodes become groups of spatially close objects. The aggregate objects are very small in size relative to markup objects, and therefore make the transfer of the index spatial access data structure to the user very fast and efficient.

Thus, the construction of the spatial access tree may proceed as follows. Initially, all objects are inserted into a spatial access tree data structure may be set as leaf nodes. In order to allow ease of transfer, these image objects are stored in bulk, so branches above the leaf nodes containing the image objects are extracted and morphed into a composite object. The composite objects are stored in a key access data structure. New indexing objects are created for each composite object, with the spatial dimensions of the composite object and the reference to the composite object as a value. The indexing objects are all added into a spatial access tree data structure that is stored to serve as an indexing tree. The composite object reference data structure is stored to be accessed through the indices held in the indexing tree.

At block 504, method 500 may provide the indexing tree to a client computer. The providing may be by way of an electronic file transfer over the internet from a client computer to a server computer, for example.

The data from the original medical image itself may be stored as tiles, e.g., the tiles obtained per method 100. These tiles may be organized using a pyramid tree that allows for presenting images at varying resolutions. Based on a user's pans and zooms of this image data as displayed on a client computer, the client computer uses the indexing tree to request object data at block 506 of method 500, which it may obtain from a remote server at block 508. That is, a spatial access search is performed on the indexing tree to find the resultant leaf nodes. These leaf nodes each have a reference to a location in the composite object reference data structure. These references are used to recover only the necessary portions of the composite object reference data structure. The client computer obtains the respective object data and then overlays the object data onto the respective image data for display.

Figure 6:
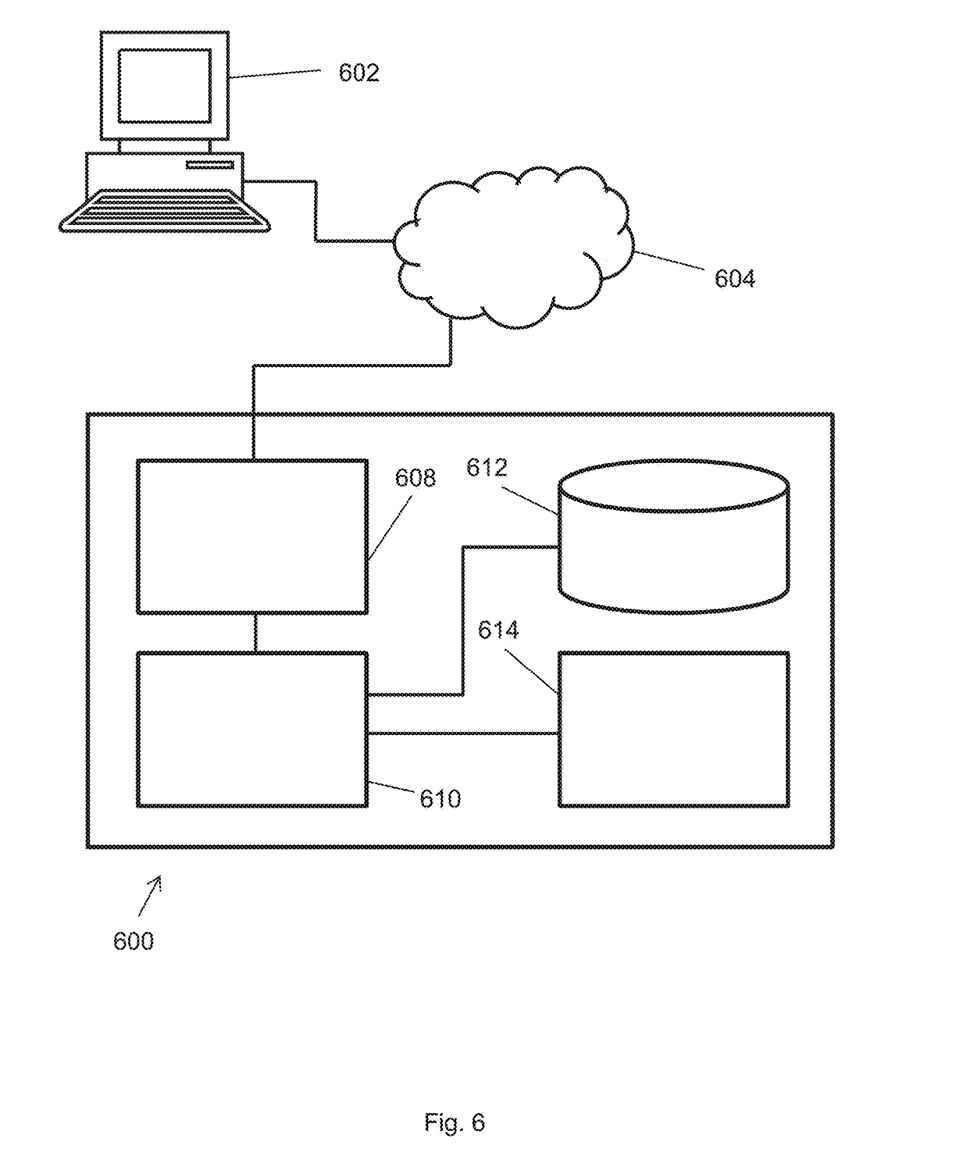
FIG. 6 is a schematic diagram depicting a system according to some embodiments.

FIG. 6 is a schematic diagram of a system 600 suitable for implementation of a method as shown and described, e.g., methods 100 and/or 500. System 600 may be based around an electronic hardware internet server computer 606 that includes one or more electronic processors 610, which may be communicatively coupled to the internet 604. System 600 includes network interface 608 to affect the communicative coupling to the internet 604, and, through internet 604, client computer 602. Network interface 608 may include a physical network interface, such as a network adapter. System 600 may be a special-purpose computer, adapted for reliability and high-bandwidth communications. Thus, system 600 may be embodied in a cluster of individual hardware server computers, for example. Processors 610 may be multi-core processors suitable for handling large amounts of information. In particular, processors 610 may be highly parallel. Processors 610 are communicatively coupled to persistent memory 612, and may execute instructions stored thereon to effectuate the techniques disclosed herein on concert with client computer 602 and/or client computer 616 as shown and described in reference to FIGS. 1 and 5. Persistent memory 612 may be in a Redundant Array of Inexpensive Disk drives (RAID) configuration for added reliability. Processors 610 are also communicatively coupled to volatile memory 614. Volatile memory 614 may be or include Error-Correcting Code (ECC) memory hardware devices In some embodiments, the disclosed techniques operate together synergistically. Because of the amount of data, an automated algorithm may be used to detect many objects in a medical image, but such objects cannot be effectively viewed without an efficient way to look up which objects fall within any particular field of view. In other words, automated object detection by itself is only partially useful (e.g., for collecting statistics) unless there is a good way to view a small portion of them. According to some embodiments, the parallelization through the use of component multiple tiles, and then the individual processing for stain normalization, segmentation, and declustering, followed by the global merge, operate together to permit efficient identification and viewing of objects of interest.

Certain examples described above can be performed in part using a computer application or program. The computer program can exist in a variety of forms, both active and inactive. For example, the computer program can exist as one or more software programs, software modules, or both, that can be comprised of program instructions in source code, object code, executable code or other formats, firmware program(s), or hardware description language (HDL) files. Any of the above can be embodied on a computer readable medium, which can include computer readable storage devices and media in compressed or uncompressed form. Exemplary computer readable storage devices and media include conventional computer system RAM (random access memory), ROM (read-only memory), EPROM (erasable, programmable ROM), EEPROM (electrically erasable, programmable ROM), and magnetic or optical disks or tapes.

Those skilled in the art will be able to make various modifications to the described examples without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A computer-implemented method of processing medical images, the method comprising:
    accessing an electronically stored at least one medical image;
    electronically representing a plurality of overlapping tiles that cover the at least one medical image, each overlapping tile of the plurality of overlapping tiles comprising a non-overlapping inner portion and an overlapping marginal portion;
    in parallel, and individually for each of a plurality of the overlapping tiles:
    applying a segmentation process to identify objects in the at least one medical image;
    identifying inner object data representing at least one inner object that is contained within an inner portion of at least one tile; and
    identifying marginal object data representing at least one marginal object that overlaps a marginal portion of at least one tile;
    merging at least some of the marginal object data to produce merged data; and
    outputting object data comprising the inner object data and the merged data.

2. The method of claim 1, wherein:
    the at least one medical image comprises a whole slide image; and
    the object data represents at least one: cell nucleus, cell nucleoli, gland, tumor, or image artifact.

3. The method of claim 1, wherein the merging at least some of the marginal object data comprises:
    splitting marginal object data for at least one pair of overlapping objects to produce split object data;
    stitching together the split object data to produce stitched object data; and
    smoothing the stitched object data.

4. The method of claim 3, further comprising recursively merging at least some of the marginal object data for at least one pair of overlapping objects that are included in more than two of the plurality of overlapping tiles.

5. The method of claim 1, further comprising, in parallel, and individually for each of a plurality of the overlapping tiles: applying a stain normalization process.

6. The method of claim 1, further comprising causing at least a portion of the at least one medical image overlaid by at least a portion of the object data to be displayed.

7. The method of claim 1, further comprising building a spatial access tree structure from the object data.

8. The method of claim 7, further comprising:
    removing object data from the spatial access tree structure;
    storing the object data in persistent memory;
    providing, over a computer network, the spatial access tree structure to at least one client computer, whereby the at least one client computer queries the spatial access tree structure with bounding box data and receives identifying data for at least one included object included within a bounding box represented by the bounding box data;
    receiving query data from the at least one client computer, the query data comprising the identifying data for the at least one included object included within the bounding box represented by the bounding box data; and
    providing object data for the at least one included object included within the bounding box represented by the bounding box data.

9. The method of claim 1, further comprising declustering the object data to split at least one identified object into at least two disjoint objects.

10. The method of claim 9, wherein the declustering comprises:
    computing curvature data for at least one clustered object represented by the object data;
    determining, based on the curvature data, that the at least one clustered object is a clustered object; and
    applying an adaptive watershed technique to the at least one clustered object, whereby the at least one clustered object is split into at least two unclustered object.

11. A system for processing medical images, the system comprising an electronic persistent memory and at least one electronic processor, wherein:
    the electronic persistent memory is configured to store at least one medical image; and
    wherein the at least one electronic processor is configured to electronically represent a plurality of overlapping tiles that cover the at least one medical image, each overlapping tile of the plurality of overlapping tiles comprising a non-overlapping inner portion and an overlapping marginal portion;
    wherein the at least one electronic processor is further configured to, in parallel, and individually for each of a plurality of the overlapping tiles:
    apply a segmentation process to identify objects in the at least one medical image;
    identify inner object data representing at least one inner object that is contained within an inner portion of at least one tile; and
    identify marginal object data representing at least one marginal object that overlaps a marginal portion of at least one tile;
    wherein the at least one electronic processor is further configured to perform:
    merging at least some of the marginal object data to produce merged data; and
    outputting object data comprising the inner object data and the merged data.

12. The system of claim 11, wherein:
    the at least one medical image comprises a whole slide image; and
    the object data represents at least one: cell nucleus, cell nucleoli, gland, tumor, or image artifact.

13. The system of claim 11, wherein the merging at least some of the marginal object data comprises:
    splitting marginal object data for at least one pair of overlapping objects to produce split object data;
    stitching together the split object data to produce stitched object data; and
    smoothing the stitched object data.

14. The system of claim 13, wherein the at least one electronic processor is further configured to recursively merge at least some of the marginal object data for at least one pair of overlapping objects that are included in more than two of the plurality of overlapping tiles.

15. The system of claim 11, wherein the at least one electronic processor is further configured to, in parallel, and individually for each of a plurality of the overlapping tiles apply a stain normalization process.

16. The system of claim 11, wherein the at least one electronic processor is further configured to cause at least a portion of the at least one medical image overlaid by at least a portion of the object data to be displayed.

17. The system of claim 11, wherein the at least one electronic processor is further configured to build a spatial access tree structure from the object data.

18. The system of claim 17, wherein the at least one electronic processor is further configured to:
   remove object data from the spatial access tree structure;
   store the object data in the electronic persistent memory;
   provide, over a computer network, the spatial access tree structure to at least one client computer, whereby the at least one client computer queries the spatial access tree structure with bounding box data and receives identifying data for at least one included object included within a bounding box represented by the bounding box data;
   receive query data from the at least one client computer, the query data comprising the identifying data for the at least one included object included within the bounding box represented by the bounding box data; and
   provide object data for the at least one included object included within the bounding box represented by the bounding box data.

19. The system of claim 11, wherein the at least one electronic processor is further configured to decluster the object data to split at least one identified object into at least two disjoint objects.

20. The system of claim 19, wherein the at least one electronic processor is further configured to decluster the object data to split the at least one identified object into at least two disjoint objects by:
   computing curvature data for at least one clustered object represented by the object data;
   determining, based on the curvature data, that the at least one clustered object is a clustered object; and
   applying an adaptive watershed technique to the at least one clustered object, whereby the at least one clustered object is split into at least two unclustered object.

* * * * *